Nov. 30, 1965    J. P. MAGOS    3,220,282
YOKE ADAPTOR FOR GEAR OR MOTOR OPERATOR
Filed Jan. 23, 1964    2 Sheets-Sheet 1

Inventor.
John P. Magos.
By Joseph O. Lange
Atty.

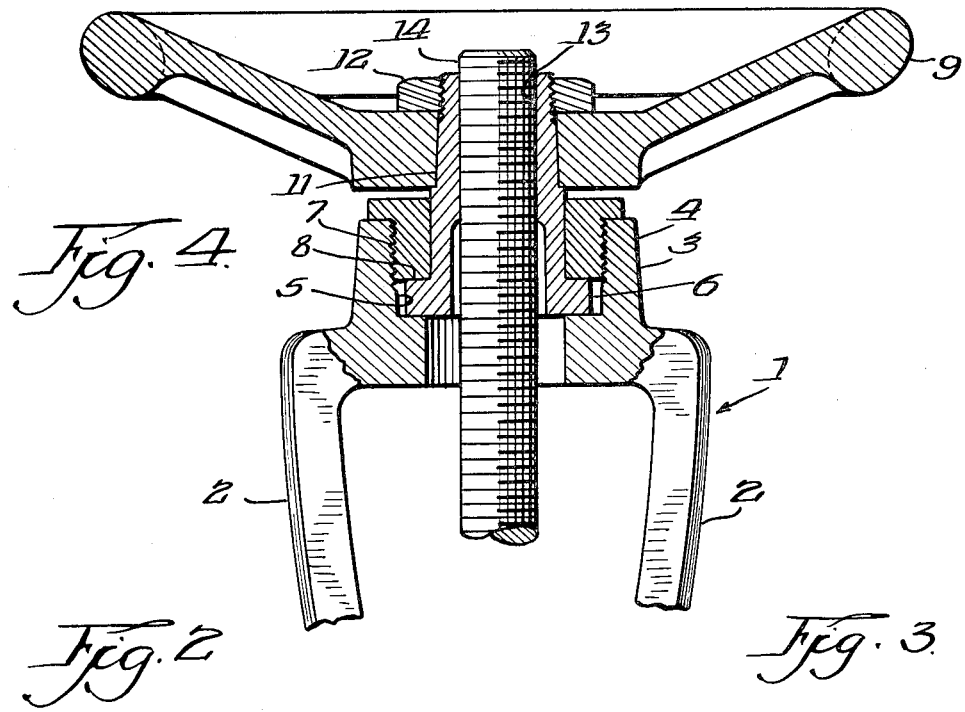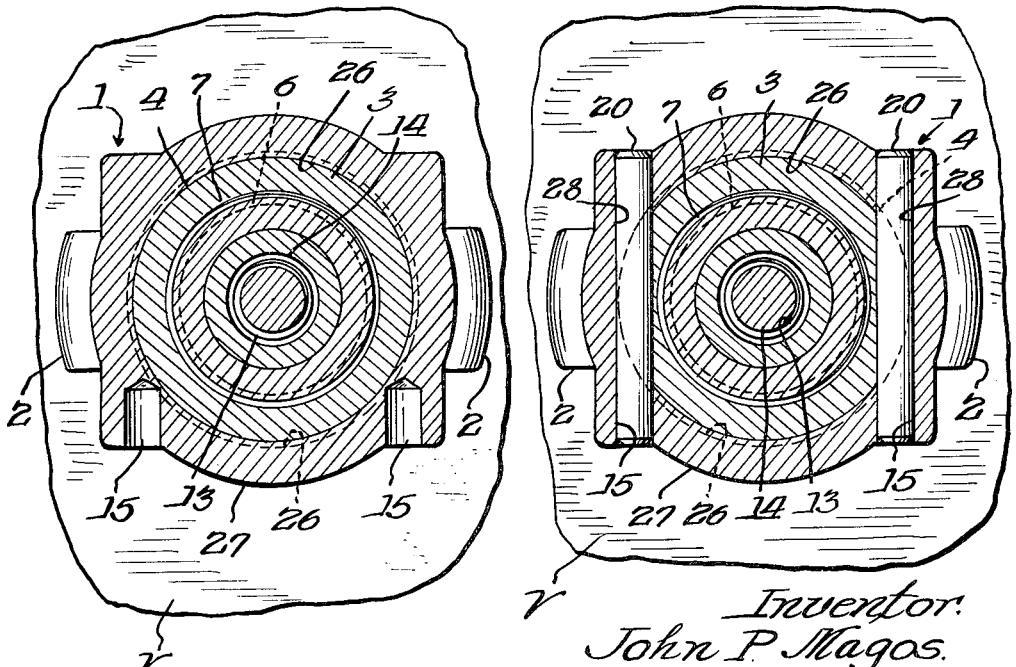

United States Patent Office 3,220,282
Patented Nov. 30, 1965

3,220,282
YOKE ADAPTOR FOR GEAR OR MOTOR
OPERATOR
John P. Magos, Wilmette, Ill., assignor to Crane Co., Chicago, Ill., a corporation of Illinois
Filed Jan. 23, 1964, Ser. No. 339,676
7 Claims. (Cl. 74—625)

This invention relates generally to motor or gear unit adaptor means, and, more particularly, it is concerned with a novel and convenient mechanism for attachment of such power or gear units readily to the valves already manufactured and frequently installed in the field.

At the outset, in order to have a better appreciation of the merits of this contribution, it should be understood that the number and variety of installations concerned with processing, for example, are many and variable. This situation requires special consideration in the selection of valve operating mechanisms, as well as to the type of valve recommended for such use.

For example, for the starting period of new processes especially in the chemical industry, the valves selected for such service are hand-operated initially. Later on, however, after the process is well established, these valves have to be converted to automation if in the interests of economy such step becomes desirable. It is, therefore, important that such conversion be done in the field in a relatively short space of time and with minimum cost, without removing the valve from the pipeline and preferably without interrupting the process itself. Obviously, shutdowns are costly because of the adverse effect upon production.

Therefore, it is one of the more important objects of this invention to provide a valve structure which is especially designed for the conversion from, say, hand operation to motor or gear operation, such as the type shown, for example, in the "Converto-Gear" operator shown in U.S. Patents 3,034,371, 3,115,786, and 3,115,787, manufactured and sold by Crane Co., Chicago, Illinois.

Another object is to provide for a valve operating mechanism in which such conversion as above referred to can be done by relatively unskilled labor in the field and without any special machining operation or tools aside from the drills used for mounting holes as will hereinafter be explained in more detail.

Another object is to provide for a conversion type of valve operating mechanism which possesses such flexibility in its mounting as to be capable of use with a variety of valves in which the common denominator of all is a valve yoke of the conventional type for journalling the valve stem in the normal course of opening or closing the valve.

Another object is to provide for a conversion unit in which upon the simple removal of the initially installed handwheel a relatively simple motor or gear adapter plate can be attached thereto.

Another important object is to provide for a gear or motor operated mechanism in which it is relatively simple to complete pre-drilled holes in the collar section of the gear adapter and in which such pre-drilled holes serve as a guide for drilling of holes to receive suitable pins engaging the yoke hub of the valve and the collar of the gear adaptor.

A further important object is to provide for a conversion type of valve operating mechanism in which the gearing or the attached motor can be installed with their respective axis in any desired direction relative to the axis of valve flow from the pipeline.

Other objects and advantages will become more readily apparent upon proceeding with the following description read in light of the accompanying drawings, in which:

FIG. 2 is a fragmentary sectional view taken on the line 3—3 of FIG. 1, showing the pre-drilled or pilot holes in the hub section of the valve yoke;

FIG. 3 is a view also taken on the line 3—3 of FIG. 1, but with said pre-drilled holes drilled through or completed and after having received the locking pins;

FIG. 4 is a fragmentary sectional view showing a conventional hand-operated valve at an upper portion thereof prior to the conversion of hand operation to motor or gear operation.

Similar reference numerals refer to similar parts throughout the several views.

Figure 1:
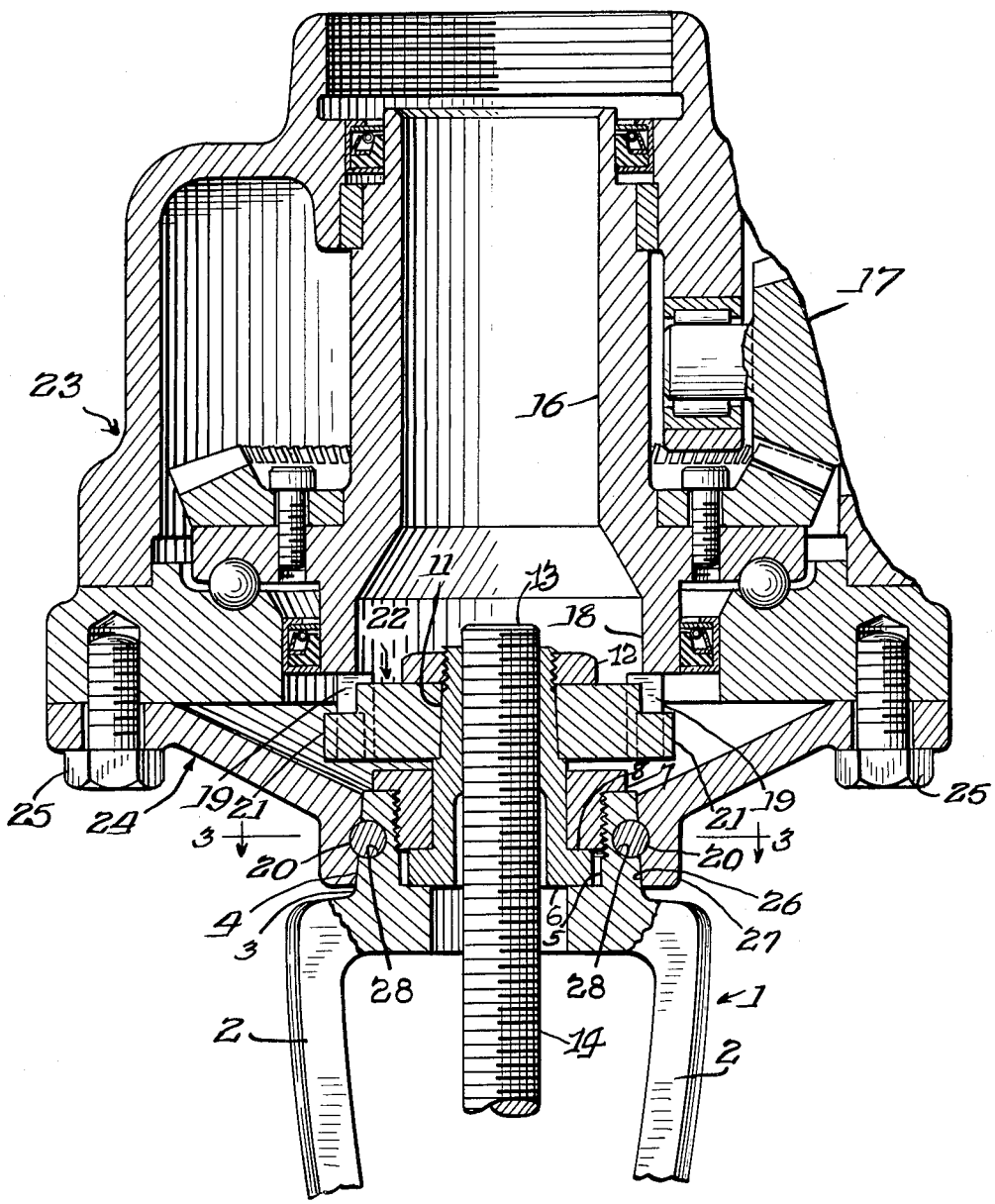
FIG. 1 is a fragmentary sectional assembly view of a valve mounting employing the conversion operating mechanism of this invention.

Referring initially to FIG. 4, a conventional hand-operated valve (partly shown) is supplied with the usual yoke generally designated 1 having the side disposed arms 2 and joining the latter at an upper portion thereof by means of the hub 3 of frusto-conical configuration as indicated at 4 for purposes hereinafter to be explained in detail. The latter surface is preferably machined for accuracy to function in the manner also hereinafter set forth, such machining referred to taking place at the time the valve is originally manufactured. The hub 3 is hollow as indicated at 5 to receive the yoke sleeve 6, the latter member being retained in position by means of the yoke sleeve nut 7 threadedly attached as indicated to hold the yoke sleeve 6 firmly in the chamber 5 against substantial axial movement while permitting rotation by engagement of the annular shoulder 8 as indicated. The handwheel 9 is non-rotatably mounted on the yoke sleeve 6 upon the surface 11 and held in firm position on the said latter surface by means of the retaining wheelnut 12.

The yoke sleeve 6 as indicated at 13 is threaded to receive the threaded stem 14. Thus, it should be clear that upon suitable rotation of the handwheel 9, depending upon whether the valve is being opened or closed, the yoke sleeve 6 will be similarly rotated and thereby cause the valve stem 14 to be axially moved and thus open or close the valve by means of a closure member (not shown) attached at the lower end portion of the valve stem.

Thus far the description of the figures has been directed solely to a conventional hand-operated valve as purchased from the manufacturer and installed in the field and ready for conversion to motor or gear operation for the reasons hereinabove explained.

In this connection, attention is now directed to a conventional gear operator of the type shown in U.S. Patent No. 3,034,371, and illustrated in FIG. 1. For clarity and understanding of this invention, it should be appreciated that in addition to the hub 3 of the yoke 1 as indicated being machined with the frusto-conical surface 4, the collar portion 27 of the gear adaptor plate 24, is transversely drilled, as shown more clearly in FIG. 2, with the pre-drilled pilot holes 15 preferably oppositely disposed. It will be appreciated that a single hole may be sufficient and further, if desired, the collar 27 of the gear adaptor plate may be through-drilled instead of pre-drilled as shown in FIG. 2. Such arrangement will have the benefit of reducing the amount of drilling in the field.

As shown in FIG. 1, the drive sleeve 16 of said operator driven by the bevel gear partially shown and indicated at 17 is provided at its lower portion with an annular hollow extension 18 suitably relieved on its periphery as indicated at 19 to form lug means engaging the annular projections or radially extending spaced-apart lugs 21 of the driven yoke sleeve adaptor of this invention generally designated 22. The said yoke sleeve adaptor fits on the polygonally formed portion 11 of the yoke sleeve and thus replaces the handwheel 9 previously described in connection with FIGS. 4.

Upon assembly of the gear adaptor plate 24 over and upon the finished frusto-conical surface 4 of the hub 3 of the yoke and upon positioning said operator in the desired direction relative to the valve flow axis, the said pre-drilled holes 15 in gear adaptor plate are now through-drilled to receive the pins 20 as indicated in FIG. 3. The said pins engage the hub portion 3 of the yoke and the lower depending portion of the gear adaptor plate 24 as shown more clearly in FIG. 1.

It will be appreciated that the pre-drilled holes 15 thus serve as a guide in the through-drilling of the collar portion 27 of the gear adaptor plate and the hub portion of the yoke.

Thus, after removal of the handwheel 9 as previously mentioned the motor or gear adaptor plate 24 having the collar 27 suitably machined can be attached and accurately located as shown in FIG. 1.

It will be appreciated that the conical bore 26 in the collar of the gear adaptor plate matches the frusto-conical surface 4 of the hub 3 of the yoke and thereby permits a tight taper fit being made between the yoke 1 and the gear adaptor plate 24.

Further, it must be appreciated that the pins 20 are preferably driven into the through-hole portions 15 and 28 respectively assuring a solid connection being made between the valve yoke 1 and the gear adaptor plate 24 for transmitting either the motor torque or the gear torque to the valve stem 14. It will also now be apparent that the attached motor or gear operated unit such as that covered by the said patents can easily be attached with its axis in any desired direction relative to the valve flow axis. Further, this can be done without requiring the services of any special tools other than portable drills and without any special jigs or fixtures for effecting the desired attachment. Also, it will be appreciated that the pins 20 by reason of the through-drilling employed may be inserted and removed from either side of the operator. This provides the advantage that even if the valve were installed immediately adjacent a wall such installation would not interfere with the mounting or disassembly thereof.

Thus, it should be apparent that the invention is capable of economical, simple, and accurate installation upon valves already in the field and may be installed on valve yokes with the pre-drilled recesses 15 of the adaptor plate collar 24 and forming the yoke hub 3 in the manner hereinabove described. Thus, while the invention has only been described in connection with one form of valve, it will be understood that it is capable of being applied to a number of varieties of valves within the spirit of the invention. Accordingly, the latter should be interpreted in accordance with the claims as hereinafter set forth.

I claim:

1. Adaptor connection means for a gear operator or the like with a drive sleeve for a valve with non-rotatable rising stem and a yoke having a hollow hub with a rotatable yoke sleeve therewithin, the yoke hub having an outer frusto-conical surface defining the said hub, adaptor means connected to the operator and having an internal frusto-conical surface substantially coinciding with the frusto-conical surface of said hub for snugly receiving said frusto-conical hub portion, said rotatable yoke sleeve being provided with an adaptor having coupling means engaged with said operator drive sleeve, and means for securing said first named adaptor means to said yoke hub to inhibit any movement therebetween.

2. The subject matter of claim 1, the said first-named adaptor means being pre-drilled to initially locate said movement inhibiting means.

3. The subject matter of claim 2, said movement inhibiting means comprising pins engaging said yoke hub and said first-named adaptor means, the said pins being axially aligned by means of said pre-drilling.

4. The subject matter of claim 3, the said first-named adaptor means and operator being selectively rotatable relative to said yoke preliminary to final positioning of said operator, completion of drilling for said pins and insertion of said pins to locate said operator axis in desired relation to the flow axis of the valve.

5. The subject matter of claim 4, the said completion of the drilling allowing for insertion and removal from either side of the operator.

6. The subject matter of claim 1, said adaptor coupling means comprising the lower peripheral portion of the said drive sleeve and an outer peripheral portion of said yoke sleeve adaptor being engaged to effect rotation of said yoke sleeve and axial movement of said stem.

7. The subject matter of claim 1, the yoke sleeve adaptor being non-rotatably mounted on said yoke sleeve and being apertured to be interchangeable with a handwheel normally employed to effect manual operation of the valve.

References Cited by the Examiner
UNITED STATES PATENTS

| 2,859,639 | 11/1958 | Bryant | 74—625 |
| 3,129,603 | 4/1964 | Natho | 74—424.8 |

DON A. WAITE, *Primary Examiner.*

LEONARD H. GERIN, *Examiner.*